US008837432B2

(12) United States Patent
Wang

(10) Patent No.: US 8,837,432 B2
(45) Date of Patent: Sep. 16, 2014

(54) MOBILE NODE REGISTRATION

(75) Inventor: Xingyuan Wang, Dalian (CN)

(73) Assignee: Empire Technology Development LLC, Wilmington, DE (US)

(*) Notice: Subject to any disclaimer, the term of this patent is extended or adjusted under 35 U.S.C. 154(b) by 183 days.

(21) Appl. No.: 13/497,255

(22) PCT Filed: Apr. 15, 2011

(86) PCT No.: PCT/CN2011/072843
§ 371 (c)(1),
(2), (4) Date: Mar. 21, 2012

(87) PCT Pub. No.: WO2012/139300
PCT Pub. Date: Oct. 18, 2012

(65) Prior Publication Data
US 2012/0314601 A1    Dec. 13, 2012

(51) Int. Cl.
*H04W 60/00* (2009.01)
*H04W 8/08* (2009.01)
*H04W 76/02* (2009.01)

(52) U.S. Cl.
CPC ............ *H04W 8/082* (2013.01); *H04W 76/022* (2013.01)
USPC ........................................ 370/331; 455/435.1

(58) Field of Classification Search
USPC .......................................... 370/252, 331, 241
See application file for complete search history.

(56) References Cited

U.S. PATENT DOCUMENTS

| 7,606,191 | B1 | 10/2009 | Breau et al. | |
| 2007/0177559 | A1* | 8/2007 | Jain et al. | 370/338 |
| 2010/0166179 | A1 | 7/2010 | Gundavelli et al. | |
| 2010/0246545 | A1* | 9/2010 | Berzin | 370/338 |
| 2011/0004913 | A1* | 1/2011 | Nagarajan et al. | 726/1 |
| 2011/0090794 | A1* | 4/2011 | Cherian et al. | 370/235 |
| 2011/0110394 | A1* | 5/2011 | Kaess et al. | 374/121 |
| 2011/0216744 | A1* | 9/2011 | Taaghol et al. | 370/332 |

FOREIGN PATENT DOCUMENTS

| CN | 1394397 A | 1/2003 |
| CN | 1395769 A | 2/2003 |

OTHER PUBLICATIONS

Notification of Transmittal of the International Search Report and the Written Opinion of the International Searching Authority, Feb. 2, 2012.
E. Fogelstroem et al., "Mobile IPv4 Regional Registration", Jun. 2007.
Bongsue Suh et al., "Localized Registration in Mobile IP Networks Based on Variable Neighbor Scope", May 2003, ICU-OIRC program, 2nd COST 273 Workshop on Broadband wireless Local Access, Paris, France.
Ren-Lei Li, "Research on Security Mechanism of AAA-based Mobile IP", Science Techonology and Engineering, Jan. 2010, vol. 10, No. 2, China Academic Journal Electronic Publishing House.
Hsieh Wei, "Protocol Design and Corresponding Security Analysis on Mobile IP", Xidian University, Jan. 8, 2004, pp. 1-53.

* cited by examiner

*Primary Examiner* — Brian D Nguyen
(74) *Attorney, Agent, or Firm* — Ren-Sheng International

(57) ABSTRACT

A method is disclosed for a mobile node to register with a home agent on a home network when the mobile node is located near a border between two or more foreign domains. A buffer zone is defined that includes the border between the foreign domains and overlapping portions of the foreign domains. When the mobile node is located inside the buffer zone, mobile node re-registration with either foreign agent is limited to once for each registration lifetime rather than each time the mobile node crosses from one foreign domain to another foreign domain.

21 Claims, 4 Drawing Sheets

MOBILE NODE REGISTRATION

CROSS-REFERENCE TO RELATED APPLICATIONS

The present application is a 371 application of International Application PCT/CN2011/072843, filed on Apr. 15, 2011 and entitled "MOBILE NODE REGISTRATION." The International Application, including any appendices or attachments thereof, is incorporated by reference herein in its entirety.

TECHNICAL FIELD

The present disclosure relates generally to mobile technologies and more specifically to mobile node registration.

BACKGROUND

Unless otherwise indicated herein, the approaches described in this section are not prior art to the claims in this application and are not admitted to be prior art by inclusion in this section.

The use of mobile computing devices such as laptops, notebook computers, personal digital assistants (PDAs) and cellular telephones to access the Internet is becoming increasingly popular. These mobile computing devices enable users to move from one location to another, or "roam," while continuing to maintain connectivity to the Internet. To facilitate fast and secure mobile computing with such devices, an extensive infrastructure has been put in place that includes multiple wireless communication networks deployed over extensive and typically overlapping geographical areas and which typically conform to one or more industry-wide mobile IP standards for routing information to a user.

Mobile IP (Internet protocol) allows location-independent routing of IP datagrams on the Internet to a roaming mobile computing device, or "mobile node." Each mobile node is identified by its home address independent of its current physical location. When away from its home network, a mobile node is associated with a care-of address identifying its current location while the home address is associated with the local endpoint of an IP tunnel to the home agent of the mobile node. Using mobile IP, a mobile node may change the point-of-attachment to the Internet, i.e., the local endpoint of the IP tunnel to the home agent, without changing the home IP address, thereby allowing the mobile node to maintain transport and higher-layer connections while roaming. Thus, mobile IP provides an efficient, scalable mechanism for roaming within the Internet, so that the user of a mobile node has access to the Internet regardless of where a user is located and whether the user is stationary or moving.

SUMMARY

In accordance with one embodiment of the disclosure, a method for a mobile node to register with a home agent on a home network includes registering with the home agent to establish a first Internet protocol (IP) tunnel between the home agent and a first foreign agent on a first foreign network, after the registering, detecting entry into a buffer zone that includes a portion of the first foreign network that extends into a second foreign network and a portion of the second foreign network that extends into the first foreign network, in response to the detected entry, registering with the home agent to establish a second IP tunnel between the home agent and a second foreign agent of the second foreign network, and while located inside the buffer zone, discarding datagrams from one of the first IP tunnel and the second IP tunnel and accepting datagrams from the home agent via the other of the first IP tunnel and the second IP tunnel.

In accordance with another embodiment of the disclosure, a method for a mobile node to register with a home agent on a home network when the mobile node is located in a buffer zone that includes a portion of a first foreign network served by a first foreign agent and a portion of a second foreign network served by a second foreign agent includes, while the mobile node is located inside the buffer zone, maintaining registrations with the home agent for a first IP tunnel between the home agent and the first foreign agent and the second IP tunnel between the home agent and the second foreign agent by re-registering only once within respective registration lifetimes.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
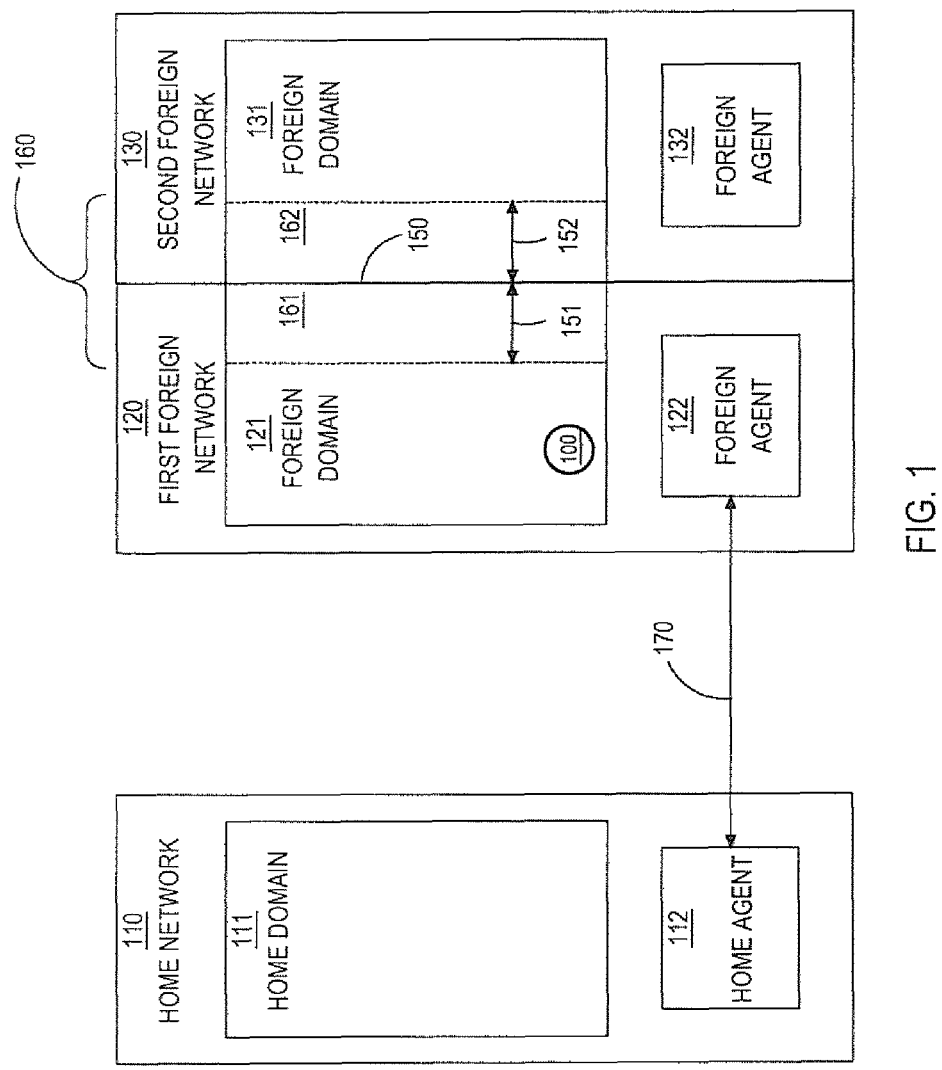
FIG. 1 shows a block diagram of an illustrative embodiment of a home network of a mobile node, a first foreign network, and a second foreign network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the Figures, can be arranged, substituted, combined, and designed in a wide variety of different configurations, all of which are explicitly contemplated and make part of this disclosure.

Mobile IP (Internet protocol) is a protocol intended to provide seamless access to the Internet for a mobile node that is located outside the home network, i.e., in a foreign domain, even when the mobile node moves from one foreign domain to another foreign domain. According to mobile IP standards, upon entering a foreign domain a mobile node obtains a care-of address on the foreign network, and exchanges a registration request and registration reply with the mobile node home agent to register the new care-of address. Datagrams sent to the mobile node home address are intercepted by the mobile node home agent, tunneled by the mobile node home agent to the mobile node care-of address, received at the tunnel endpoint, i.e., either at a foreign agent or at the mobile node itself, and finally delivered to the mobile node.

While mobile IP is designed to accommodate movement of a mobile node between foreign domains, there are situations in which signaling load, packet loss, and unacceptably long delays can still occur. Specifically, whenever a mobile node is in a border region between two foreign domains and moves either very quickly and/or very near to the border between the two foreign domains, the mobile node will repeatedly detect entry into one or the other of the two foreign domains over a relatively short interval in time. With each new entry into a different foreign domain, the mobile node will perform the required registration process with the home agent and the foreign agent of the foreign domain newly entered, even though such a hand-off is not required to maintain Internet connectivity. In such a situation, a mobile node can occupy substantial network and server resources, thereby increasing network burden and handoff latency, despite the fact that the mobile node is not sending or receiving user-requested information.

Embodiments disclosed herein contemplate a method for a mobile node to register with a home agent on a home network when the mobile node is located near a border between two or more foreign domains. A buffer zone is defined that includes the border between the foreign domains and also the portion of each foreign domain adjacent to said border. When the mobile node is located inside the buffer zone, mobile node re-registration with either foreign agent is limited to once for each registration lifetime rather than each time the mobile node crosses from one foreign domain to another foreign domain.

FIG. 1 shows a block diagram of an illustrative embodiment of a home network 110 of a mobile node 100, a first foreign network 120, and a second foreign network 130. To facilitate free roaming and Internet access of mobile node 100, home network 110, first foreign network 120, and second foreign network 130 are wireless communication networks configured to conform to one or more industry-wide mobile IP standards. Such roaming standards include Mobile IPv4, aka IETF (Internet Engineering Task Force) RFC 3344, August 2002, Mobile IPv6, aka IETF RFC 3775, June 2004, and the like. Conformance to such standards enables mobile node 100 to move from one location to another while continuing to maintain connectivity to the same network. Mobile node 100 may be any mobile computing device, such as a laptop or notebook computer, a personal digital assistant (PDA), or a smart phone, configured with one or more wireless interfaces and mobile IP software.

Home network 110 includes a home domain 111 and a home agent 112. Home domain 111 includes the geographical region served by home network 110. Home agent 112 is a router on home network 110 that tunnels datagrams for delivery to mobile node 100 when mobile node 100 is operating outside of home domain 111 and maintains current location information for mobile node 100. IP tunneling is used to hide the home address of mobile node 100 from intervening routers between home network 110 and the current location of mobile node 100. An IP tunnel, such as IP tunnel 170 between home agent 112 and a foreign agent 122, is the path followed by a datagram while it is encapsulated, and terminates at the care-of address mobile node 100. While encapsulated, a datagram intended for mobile node 100 is routed to a knowledgeable decapsulating agent, e.g., foreign agent 122, which decapsulates the datagram and then correctly delivers it to its ultimate destination, i.e., mobile node 100.

First foreign network 120 is a network located outside of home domain 110 and includes a foreign domain 121 and foreign agent 122. Foreign domain 121 includes the geographical region served by foreign network 120, and foreign agent 122 includes a router that provides routing services to mobile node 100 when mobile node 100 is registered with foreign agent 122. Foreign agent 122 detunnels and delivers datagrams to mobile node 100 that were tunneled by home agent 112. For datagrams sent by mobile node 100, foreign agent 122 may serve as a default router for mobile node 100 when mobile node 100 is registered with foreign agent 122.

Second foreign network 130 is another network located outside of home domain 110 and includes a foreign domain 131 and a foreign agent 132. Foreign domain 131 includes the geographical region served by foreign network 130, and foreign agent 132 includes a router that provides routing services to mobile node 100 in a fashion similar to foreign agent 122.

Agents, home and foreign, normally send out agent advertisements on a regular basis where the rate is set to ensure reasonably fast contact with mobile nodes without consuming excessive network bandwidth. Mobile nodes use the agent advertisements to detect their movements in and out of domains, home and foreign. For example, as mobile node 100 exits foreign domain 121 and enters foreign domain 131, mobile node 100 receives agent advertisements from foreign domains 121 and 131 and parses them to learn the capabilities of foreign agents 122 and 132. When mobile node 100 detects that signal strength from foreign agent 132 is higher than foreign agent 122, it determines it has moved from foreign domain 121 into foreign domain 131.

Foreign domain 121 and foreign domain 131 overlap geographically where a border 150 delineates where signal strengths between them are substantially the same. According to embodiments of the disclosure, a buffer zone 160 is established at the overlap area between foreign domain 121 and foreign domain 131. Buffer zone 160 includes border 150, a portion 161 of foreign domain 121 on one side of border 150 that overlaps with foreign domain 131, and a portion 162 of foreign domain 131 on the other side of border 150 that overlaps with foreign domain 121. While foreign domains 121, 131, buffer zone 160, and portions 161, 162 are represented as rectangular areas, they may be of other shapes. For example, foreign domains 121, 131 may be two circular areas, buffer zone 160 may be the intersection of the two circular areas, border 150 may be a radical line determined by the intersection, and portions 161, 162 may be two halves of buffer zone 160 divided by border 150.

Portion 161 may be defined as the portion of foreign domain 121 that is within a distance 151 from border 150, and portion 162 is defined as the portion of foreign domain 131 that is within a distance 152 from border 150. Depending on the embodiment, distances 151, 152 may be substantially equal or different. Depending on the embodiment, distances 151, 152 may be constant or vary along border 150 (e.g., largest at the center of border 150 and smaller or zero at the two ends of border 150). In some embodiment, buffer zone 160 is a geographical area where signal strengths from foreign domains 121 and domain 131 are both greater than a predetermined threshold, and distances 151, 152 are determined by the definition of border 150 and buffer zone 160. In still other embodiments, portion 161 and/or portion 162 may be predetermined geographical areas defined by other means than distances 151, 152 from border 150.

In FIG. 1, mobile node 100 is shown entering foreign domain 121. Algorithms for mobile node move detection into a foreign domain involving lifetime registration values and/or network prefixes are well-known in the art and are described in IETF RFC 3344. When mobile node 100 exits home domain 111 and enters a foreign domain, e.g., foreign domain 121, mobile node 100 registers a foreign agent care-of address with home agent 112, according to mobile IP standards. Thus, mobile node 100 receives an agent advertisement from foreign agent 122 and registers with foreign agent 122 using the advertised foreign agent care-of address. Mobile node 100 then registers with home agent 112 using a registration request message that includes the foreign agent care-of address. The registration request is either relayed to home agent 112 by foreign agent 122, or in some cases is sent directly to home agent 112 by mobile node 100. Home agent 112 sends a registration response message back to mobile node 100, either via foreign agent 122 or directly. The registration response includes a registration lifetime, which is the number of seconds remaining before the current registration of mobile node 100 with foreign agent 122 is considered expired. If mobile node 100 remains in foreign domain 121, mobile node 100 must re-register at the end of each registration lifetime. In addition, according to conventional mobile IP standards, whenever mobile node 100 leaves foreign domain 121 and enters another foreign domain, e.g., foreign domain 131, mobile node 100 must also re-register.

According to embodiments of the disclosure, when mobile node 100 enters buffer zone 160, the above-described registration process is suspended for as long as mobile node 100 remains in buffer zone 160. In this way, the scenario in which mobile node 100 repeatedly re-registers over a short period of time when mobile node 100 repeatedly crosses border 150 is avoided. Instead, when mobile node 100 detects entry into buffer zone 160, mobile node 100 will register with both foreign agent 122 and foreign agent 132, so that home agent 112 maintains an IP tunnel to each. Further, mobile node 100 will no long register whenever entry into either foreign domain 121 or 131 is detected, and will only register when each registration lifetime has expired.

Figure 2:
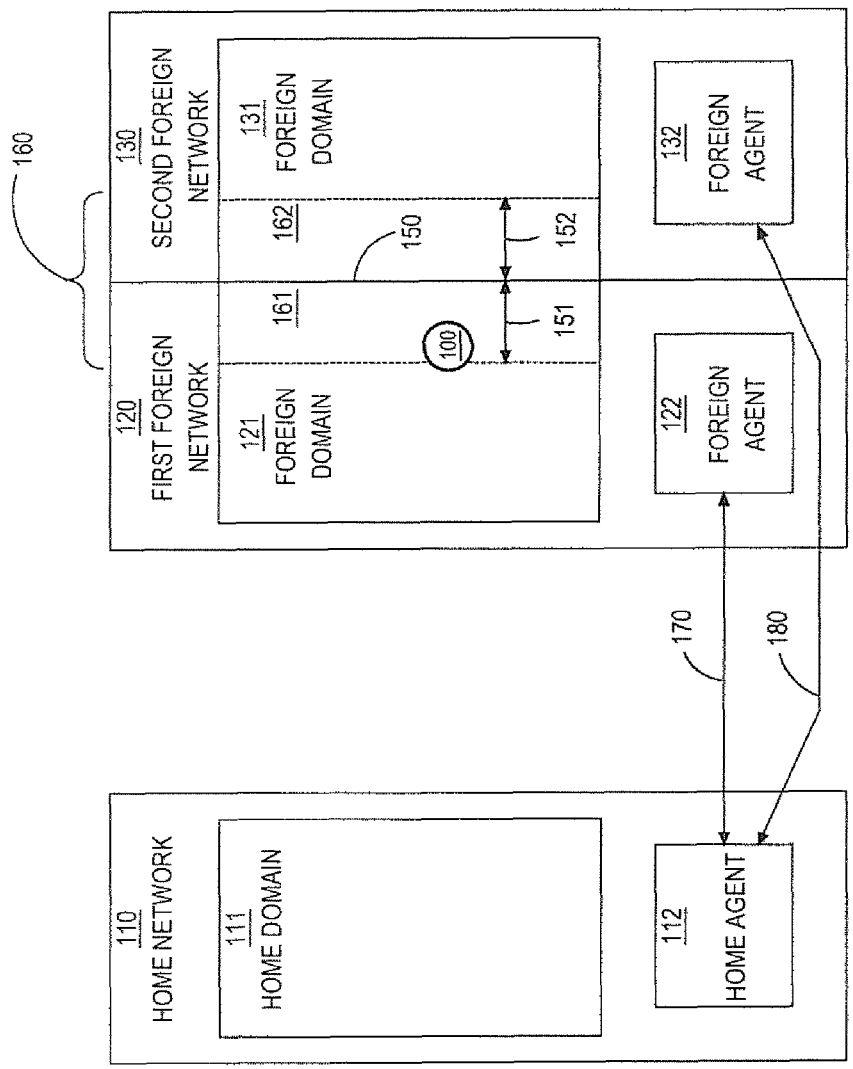
FIG. 2 shows a block diagram of an illustrative embodiment of a mobile node entering a buffer zone between a first foreign network and a second foreign network.

FIG. 2 shows a block diagram of an illustrative embodiment of mobile node 100 entering buffer zone 160 from first foreign network 120. As noted above in conjunction with FIG. 1, buffer zone 160 includes portions 161, 162. In some embodiments, mobile node 100 may detect entry into buffer zone 160 by detecting signal strengths from foreign domains 121 and 131 are higher than a predetermined threshold. In some embodiments, mobile node 100 may detect exit from buffer zone 160 and entry into a foreign domain by detecting the signal strength from the foreign domain being entered is greater than the predetermined threshold and the signal strength from the other foreign domain is less than the predetermined threshold.

Upon detecting entry into buffer zone 160 from first foreign network 120, mobile node 100 will send a message about entering the buffer zone to home agent 112, either directly or indirectly via foreign agent 122, and the mobile node will register with foreign agent 132. Consequently, home agent 112 will maintain IP tunnel 170 with foreign agent 122 and establish and maintain an IP tunnel 180 with foreign agent 132. While in buffer zone 160, mobile node 100 will only re-register once with any foreign agent during each registration lifetime associated with that particular foreign agent (e.g., re-registering at the end of each registration lifetime). Thus, frequent and repeated re-registrations do not take place if mobile node 100 frequently crosses border 150.

As long as mobile node 100 remains inside buffer zone 160, home agent 112 maintains IP tunnels 170, 180 as shown in FIG. 2, whether mobile node 100 is in portion 161 or portion 162 of buffer zone 160. However, at any time, only one of IP tunnels 179, 180 is considered valid by mobile node 100 and the mobile node will therefore discard datagrams received via the invalid IP tunnel. In some embodiments, mobile node 100 considers IP tunnel 170 to be valid as it is the IP tunnel to the foreign domain from which it enters buffer zone 160. In addition, while inside buffer zone 160, mobile node 100 maintains registration with home agent 112 for each of IP tunnels 170, 180, even though only one of said IP tunnels is considered valid. Re-registration with home agent 112 for IP tunnel 170 only occurs once within each registration lifetime associated with foreign agent 122. Similarly, re-registration with home agent 112 for IP tunnel 180 only occurs once within each registration lifetime associated with foreign agent 132.

Upon exiting buffer zone 160 and entering foreign domain 131 outside of the buffer zone, mobile node 100 will send a message about exiting the buffer zone and entering the foreign domain to home agent 112, either directly or indirectly via foreign agent 132. Mobile node 100 will then considers IP tunnel 180 to be valid. Mobile node 100 will then wait until the current registration lifetime associated with foreign agent 132 is about to expire and then determine if the mobile node has re-entered buffer zone 160 or remained in foreign domain 131 outside of the buffer zone. When mobile node 100 has re-entered buffer zone 160, the mobile node repeats the actions described above for entering the buffer zone. When mobile node 100 has remained in foreign domain 131 outside of buffer zone 160, mobile node 100 re-registers with home agent 112 for IP tunnel 180. By waiting for the expiration of the current registration lifetime after detecting buffer zone exit, mobile node 100 avoids repeated re-registration when the mobile node enters and exits buffer zone 160 frequently. Upon exiting buffer zone 160 and entering foreign domain 131 outside of the buffer zone, mobile node 100 also does not re-register with home agent 112 for IP tunnel 170. Once informed that mobile node 100 has exited buffer zone 160 and entered foreign domain 131 outside of the buffer zone, home agent 112 stops maintaining IP tunnel 170.

Upon exiting buffer zone 160 and re-entering foreign domain 121 outside of the buffer zone, mobile node 100 will send a message about exiting the buffer zone and re-entering the foreign domain to home agent 112, either directly or indirectly via foreign agent 122. Mobile node 100 will then considers IP tunnel 170 to be valid. Mobile node 100 will then wait until the current registration lifetime associated with foreign agent 122 is about to expire and then determine if the mobile node has re-entered buffer zone 160 or remained in foreign domain 121 outside of the buffer zone. When mobile node 100 has re-entered buffer zone 160, the mobile node repeats the actions described above for entering the buffer zone. When mobile node 100 has remained in foreign domain 121 outside of buffer zone 160, mobile node 100 re-registers with home agent 112 for IP tunnel 170. Again, by waiting for the expiration of the current registration lifetime after detecting buffer zone exit, mobile node 100 avoids repeated re-registration when the mobile node enters and exits buffer zone 160 frequently. Upon exiting buffer zone 160 and re-entering foreign domain 121 outside of the buffer zone, mobile node 100 also does not re-register with home agent 112 for IP tunnel 180. Once informed that mobile node 100 has exited buffer zone 160 and re-entered foreign domain 121 outside of the buffer zone, home agent 112 stops maintaining IP tunnel 180.

Figure 3:
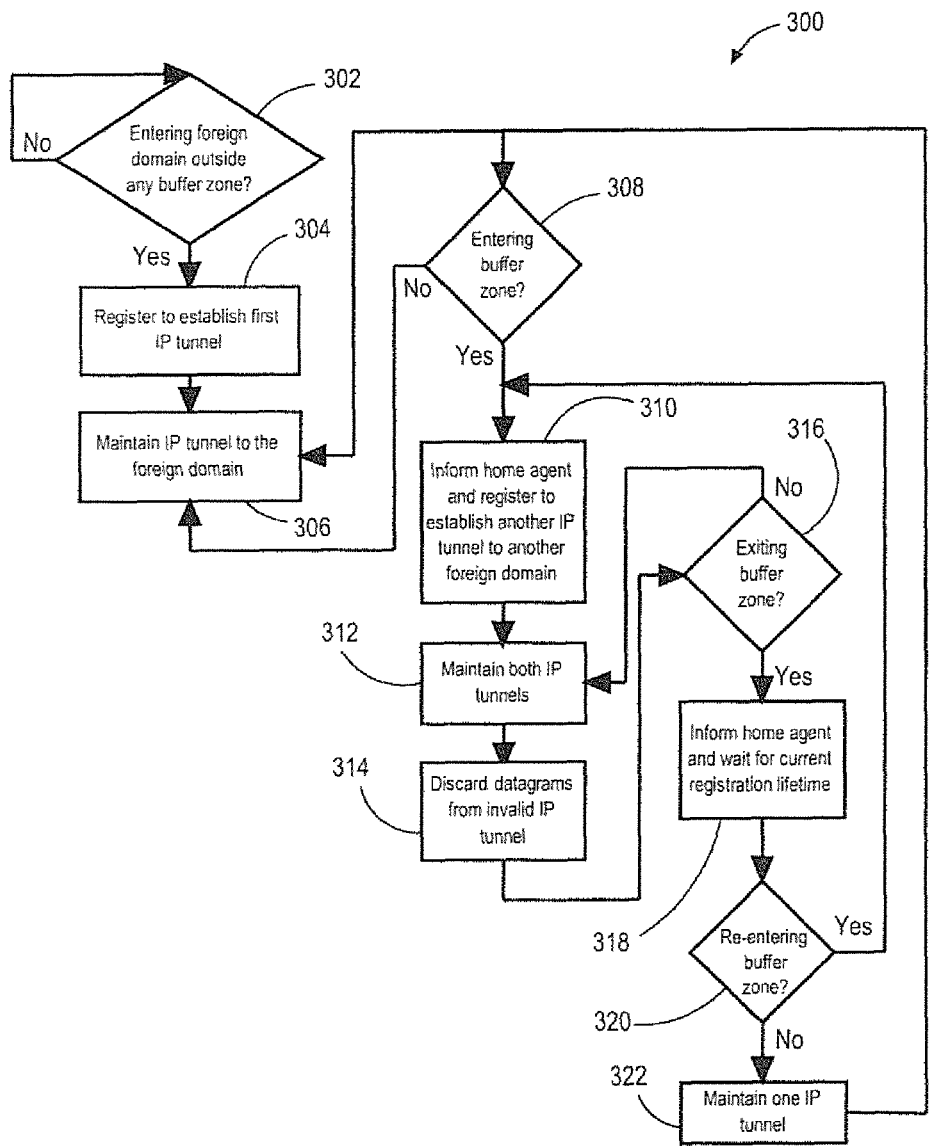
FIG. 3 sets forth a flow chart summarizing a method of registering a mobile node with a home agent on a home network when the mobile node is located near a border between two or more foreign domains, according to an embodiment of the disclosure.

FIG. 3 sets forth a flow chart summarizing a method 300 of registering a mobile node with a home agent on a home network when the mobile node is located near a border between two or more foreign domains, according to an embodiment of the disclosure. For ease of description, method 300 is described in terms of a mobile node substantially similar to mobile node 100, a home network substantially similar to home network 110, and first and second foreign networks substantially similar to first foreign network 120 and second foreign network 130. One of skill in the art will appreciate, however, that method 300 may be performed in other configurations of home and foreign networks as well.

In block 302, mobile node 100 determines if it is entering a foreign domain of a foreign network (e.g., foreign domain 121 of first foreign network 120). If so, block 302 may be followed by block 304. Otherwise block 302 may be followed by block 306.

In block 304, mobile node 100 registers with home agent 112 to establish an IP tunnel (e.g., IP tunnel 170) between home agent 112 and the foreign agent of the foreign domain (e.g., foreign agent 122 of foreign domain 121). Block 304 may be followed by block 306.

In block 306, mobile node 100 maintains the IP tunnel to the foreign domain by re-registering with home agent 112 before the registration lifetime expires. Block 306 may be followed by block 308.

In block 308, mobile node 100 determines if it is entering into a buffer zone between two foreign domains (e.g., buffer zone 160 between foreign domains 121 and 131). If so, block 308 may be followed by block 310. Otherwise block 308 may loop back to block 306.

In block 310, mobile node 100 informs home agent 122 that it is entering into a buffer zone from the foreign domain and registers with the home agent to establish another IP tunnel between the home agent and the foreign agent of the other foreign domain (e.g., foreign agent 132 of domain 131). Block 310 may be followed by block 312.

In block 312, mobile node 100 maintains both IP tunnels (e.g., IP tunnels 170 and 180). While located in the buffer zone, mobile node 100 maintains registration with home agent 112 for the two IP tunnels by re-registering only once within each of the registration lifetimes associated with the foreign agents (e.g., re-registering only once for IP tunnel 170 at the end of each registration lifetime associated with foreign agent 122, and re-registering only once for IP tunnel 180 at the end of each registration lifetime associated with foreign agent 132). Block 312 may be followed by block 314.

In block 314, while located in the buffer zone, mobile node 100 determines that one of the two tunnels is an invalid path for receiving datagrams, and discards datagrams from the invalid path. Block 314 may be followed by block 316.

In block 316, mobile node 100 determines if it is exiting the buffer zone and entering a foreign domain outside of the buffer zone (e.g., exiting buffer zone 160 and entering foreign domain 121 or 131). If so, block 316 may be followed by block 318. Otherwise block 316 may loop back to block 312.

In block 318, mobile node 100 informs home agent 122 that it is exiting the buffer zone and entering a foreign domain outside of the buffer zone. As a result, home agent 122 does not maintain the IP tunnel of the other foreign domain (e.g., IP tunnel 180 if entering foreign domain 121 or IP tunnel 170 if entering foreign domain 131). Mobile node 100 then waits for the current registration lifetime of the foreign agent from the foreign domain which it has entered to almost expire (e.g., registration lifetime of foreign agent 122 if entering foreign domain 121 or foreign agent 132 if entering foreign domain 131). Block 318 may be followed by block 320.

In block 320, mobile node 100 determines if it has re-entered the buffer zone. If so, block 320 may be followed by block 310. Otherwise block 320 may be followed by block 322.

In block 322, mobile node 100 maintains the remaining IP tunnel (e.g., IP tunnel 170 if it entered into foreign domain 121 or IP tunnel 180 if it is in foreign domain 131). Block 322 may loop back to block 308.

Figure 4:
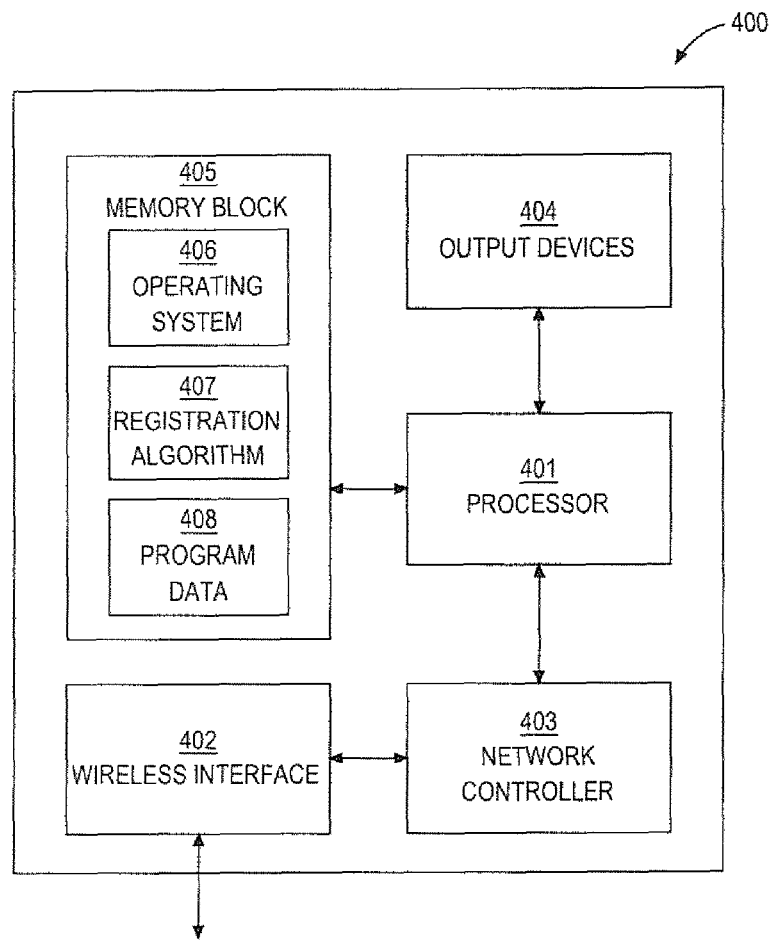
FIG. 4 is a block diagram illustrating a mobile computing device configured for registering a mobile node with a home agent when the mobile node is located in a foreign domain, according to embodiments of the disclosure.

FIG. 4 is a block diagram illustrating a mobile computing device 400 configured for registering a mobile node with a home agent when the mobile node is located in a foreign domain, according to embodiments of the disclosure. Mobile computing device 400 may be any device that may operates as a mobile node, such as a laptop or notebook computer, a PDA, a smart phone, a personal media player device, a wireless web-watch device, or other device configured with one or more wireless interfaces and mobile IP software. Mobile computing device 400 includes a processor 401, a wireless interface 402, a network controller 403, output devices 404, and a memory block 405.

Processor 401 is configured to execute instructions, such as instructions stored in memory block 405, for the operation of mobile computing device 400. Processor 400 may be of any type including but not limited to a microprocessor (pP), a microcontroller (pC), a digital signal processor (DSP), or any combination thereof. Processor 401 may include one more levels of caching, a processor core, registers, a memory controller, and the like.

Wireless interface 402 provides mobile computing device 400 with a means for wireless connection to the Internet. Wireless interface 402 may include wireless media such as acoustic, radio frequency (RF), microwave, infrared (IR) and/or other wireless media.

Network controller 403 is configured to facilitate communications with one or more other computing devices over a network communication link via one or more communication ports, including wireless interface 402.

Output devices 404 may include a graphics processing unit and/or an audio processing unit, which may be configured to communicate to various external devices such as a display or speakers.

Memory block 405 may be of any type of computer readable medium including but not limited to volatile memory (such as RAM), non-volatile memory (such as ROM, flash memory, etc.) or any combination thereof, In some embodiments, memory block 405 may include removable data storage devices, such as flexible disk drives and hard-disk drives (HOD), optical disk drives, e.g., compact disk (CD) drives or digital versatile disk (DVD) drives, solid state drives (SSD), tape drives and the like. Memory block 405 may include an operating system 406, a registration algorithm 407, and program data 408. Registration algorithm 407 includes the instructions for processor 401 that enable mobile computing device 400 to perform one or more embodiments of the disclosure. In some embodiments, registration algorithm 407 may be configured to operate with program data 408 on operating system 406 such that mobile computing device 400 performs one or more embodiments of the disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, 8, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a mobile node to register with a home agent on a home network, the method comprising:
   registering with the home agent to establish a first Internet protocol (IP) tunnel between the home agent and a first foreign agent on a first foreign network;
   after the registering, detecting entry into a buffer zone that includes (1) a portion of the first foreign network that extends into a second foreign network and (2) a portion of the second foreign network that extends into the first foreign network, the second foreign network being served by a second foreign agent;
   in response to the detected entry, registering with the home agent to establish a second IP tunnel between the home agent and the second foreign agent; and
   while located inside the buffer zone, discarding datagrams from one of the first IP tunnel and the second IP tunnel and accepting datagrams from the home agent via the other of the first IP tunnel and the second IP tunnel.

2. The method of claim 1, further comprising:
   while located inside the buffer zone, maintaining registrations with the home agent for the first IP tunnel and the second IP tunnel by re-registering only once for each of their respective registration lifetimes.

3. The method of claim 2, further comprising:
   detecting departure from the buffer zone and entry into the second foreign network; and
   in response to the detected departure:
      monitoring a registration lifetime associated with the second foreign agent; and
      before the registration lifetime expires, re-registering with the home agent for the second IP tunnel when the mobile node remains in the second foreign network.

4. The method of claim 3, further comprising:
   in response to the detected departure, informing the home agent of the departure from the buffer zone and the entry into the second foreign network, wherein the home agent stops maintaining the first IP tunnel.

5. The method of claim 3, further comprising:
   before the registration lifetime expires, re-registering with the home agent for the first IP tunnel and the second IP tunnel when the mobile node returns to the buffer zone.

6. The method of claim 2, further comprising:
 detecting departure from the buffer zone and entry into the first foreign network; and
 in response to the detected departure:
  informing the home agent of the departure from the buffer zone and the entry into the first foreign network, wherein the home agent stops maintaining the second IP tunnel;
  monitoring a registration lifetime associated with the first foreign agent; and
  before the registration lifetime expires:
   re-registering with the home agent for the first IP tunnel when the mobile node remains in the first foreign network; and
   re-registering with the home agent for the first IP tunnel and the second IP tunnel when the mobile node returns to the buffer zone.

7. The method of claim 6, wherein:
 the detecting entry into the buffer zone comprises detecting the first signal strength of the first foreign network and the second signal strength of the second foreign network are both greater than a threshold signal strength; and
 the detecting departure from the buffer zone and entry into the second foreign network comprises detecting the first signal strength is less than the threshold signal strength and the second signal strength is greater than the threshold signal strength.

8. The method of claim 2, wherein values of the registration lifetimes are received in response to registration requests for the first IP tunnel and the second IP tunnel.

9. The method of claim 1, wherein the portion of the first foreign network included in the buffer zone is defined by a first distance from a border between the first foreign network and the second foreign network.

10. The method of claim 1, wherein the portion of the first foreign network included in the buffer zone comprises a predetermined geographical area.

11. The method of claim 1, wherein the discarding comprises discarding the datagrams from the second IP tunnel.

12. A method for a mobile node to register with a home agent on a home network when the mobile node is located in a buffer zone that includes (1) a portion of a first foreign network that extends into a second foreign network and (2) a portion of the second foreign network that extends into the first foreign network, the first foreign network being served by a first foreign agent and the second foreign network being served by a second foreign agent, the method comprising:
 informing the home agent about entry into the buffer zone;
 while located inside the buffer zone, maintaining registrations with the home agent for a first IP tunnel between the home agent and the first foreign agent and a second IP tunnel between the home agent and the second foreign agent; and
 re-registering only once with either the first foreign agent or the second foreign agent during a first registration lifetime and a second registration lifetime associated with the first foreign agent and the second foreign agent, respectively.

13. The method of claim 12, wherein values of the first registration lifetime and the second registration time are received in response to registration requests for the first IP tunnel and the second IP tunnel.

14. The method of claim 12, further comprising, while located inside the buffer zone, discarding datagrams from one of the first IP tunnel and the second IP tunnel and accepting datagrams from the home agent via the other of the first IP tunnel and the second IP tunnel.

15. The method of claim 14, wherein the discarding comprises discarding the datagrams from the second IP tunnel.

16. The method of claim 12, further comprising:
 detecting departure from the buffer zone and entry into the second foreign network; and
 in response to the detected departure:
  monitoring the second registration lifetime associated with the second foreign agent; and
  before the second registration lifetime expires, re-registering with the home agent for the second IP tunnel when the mobile node remains in the second foreign network.

17. The method of claim 16, further comprising:
 in response to the detected departure, informing the home agent of the departure from the buffer zone and the entry into the second foreign network, wherein the home agent stops maintaining the first IP tunnel.

18. The method of claim 17, further comprising:
 before the second registration lifetime expires, re-registering with the home agent for the first IP tunnel and the second IP tunnel when the mobile node returns to the buffer zone.

19. The method of claim 16, wherein the detecting departure from the buffer zone and entry into the second foreign network comprises detecting a first signal strength of the first foreign network is less than a threshold signal strength and a second signal strength of the second foreign network is greater than the threshold signal strength.

20. The method of claim 12, further comprising:
 detecting departure from the buffer zone and entry into the first foreign network; and
 in response to the detected departure:
  informing the home agent of the departure from the buffer zone and the entry into the first foreign network, wherein the home agent stops maintaining the second IP tunnel;
  monitoring a registration lifetime associated with the first foreign agent; and
  before the registration lifetime expires:
   re-registering with the home agent for the first IP tunnel when the mobile node remains in the first foreign network; and
   re-registering with the home agent for the first IP tunnel and the second IP tunnel when the mobile node returns to the buffer zone.

21. The method of claim 20, wherein the detecting departure from the buffer zone and entry into the first foreign network comprises detecting a first signal strength of the first foreign network is greater than a threshold signal strength and a second signal strength of the second foreign network is less than the threshold signal strength.

* * * * *

UNITED STATES PATENT AND TRADEMARK OFFICE
CERTIFICATE OF CORRECTION

PATENT NO. : 8,837,432 B2  
APPLICATION NO. : 13/497255  
DATED : September 16, 2014  
INVENTOR(S) : Wang It is certified that error appears in the above-identified patent and that said Letters Patent is hereby corrected as shown below:

In the Specification

In Column 8, Line 25, delete "(pP)," and insert -- (µP), --, therefor.

In Column 8, Line 26, delete "(pC)," and insert -- (µC), --, therefor.

In Column 8, Line 47, delete "thereof," and insert -- thereof. --, therefor.

In Column 8, Line 50, delete "(HOD)," and insert -- (HDD), --, therefor.

In Column 9, Line 66, delete "A, 8," and insert -- A, B, --, therefor.

Signed and Sealed this  
Seventeenth Day of February, 2015

Michelle K. Lee  
*Deputy Director of the United States Patent and Trademark Office*